US010167829B2

(12) United States Patent
Seo

(10) Patent No.: US 10,167,829 B2
(45) Date of Patent: Jan. 1, 2019

(54) FUEL HEATING DEVICE FOR VEHICLE AND METHOD THEREOF

(71) Applicant: Hyundai Motor Company, Seoul (KR)

(72) Inventor: Yoo Jin Seo, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 32 days.

(21) Appl. No.: 15/373,924

(22) Filed: Dec. 9, 2016

(65) Prior Publication Data

US 2018/0017029 A1   Jan. 18, 2018

(30) Foreign Application Priority Data

Jul. 15, 2016   (KR) .................. 10-2016-0089957

(51) Int. Cl.
| | |
|---|---|
| F02M 53/06 | (2006.01) |
| F02M 53/02 | (2006.01) |
| F02M 31/125 | (2006.01) |
| F02M 57/00 | (2006.01) |

(52) U.S. Cl.
CPC .......... F02M 53/06 (2013.01); F02M 31/125 (2013.01); F02M 53/02 (2013.01); F02M 57/005 (2013.01); F02M 2200/24 (2013.01)

(58) Field of Classification Search
CPC ............... F02D 41/064; F02D 41/0025; F02D 2200/021; F02D 19/0649; F02D 19/0655; F23K 2301/204; F02M 31/125; F02M 53/02; F02M 53/06
USPC ................................ 123/552, 543; 73/114.45
See application file for complete search history.

(56) References Cited

U.S. PATENT DOCUMENTS

| 3,866,587 A * | 2/1975 | Knapp ................. F02M 31/125 123/549 |
| 4,186,560 A * | 2/1980 | Frankl ................. F02B 29/0406 123/550 |
| 8,439,018 B2 | 5/2013 | Kabasin et al. |
| 2008/0305922 A1 * | 12/2008 | Hoffmann ................ B60K 6/24 477/3 |
| 2009/0038592 A1 * | 2/2009 | Navalon Carretero ...................... F02M 31/13 123/543 |
| 2009/0120396 A1 * | 5/2009 | Krenus ............... F02D 41/0025 123/179.16 |

(Continued)

FOREIGN PATENT DOCUMENTS

| JP | 2013-177830 A | 9/2013 |
| KR | 10-1394854 B1 | 5/2014 |
| KR | 10-2016-0013388 A | 2/2016 |

*Primary Examiner* — Grant Moubry
*Assistant Examiner* — Tea Holbrook
(74) *Attorney, Agent, or Firm* — Morgan, Lewis & Bockius LLP

(57) ABSTRACT

A fuel heating device for a vehicle may include a start sensor detecting a starting of a vehicle; a controller area network (CAN) communication device transmitting and receiving various signals to and from an engine control device; a resistance sensor measuring a resistance of a heater provided inside an injector; and a controller controlling the resistance sensor to measure the resistance of the heater when the starting of the vehicle is detected in a state in which a failure occurs in the CAN communication device, converting the measured resistance of the heater into a temperature of a fuel, and operating the heater to heat the fuel to a reference temperature when the converted temperature is lower than or equal to a threshold.

8 Claims, 3 Drawing Sheets

(56) References Cited

U.S. PATENT DOCUMENTS

| | | | |
|---|---|---|---|
| 2009/0314260 A1* | 12/2009 | Maeda | F02D 19/0605 |
| | | | 123/491 |
| 2010/0256892 A1* | 10/2010 | Shartzer | F02D 41/062 |
| | | | 701/104 |
| 2011/0276252 A1* | 11/2011 | Kabasin | F02M 53/06 |
| | | | 701/103 |
| 2013/0019669 A1* | 1/2013 | Wakao | F02D 41/0025 |
| | | | 73/114.42 |
| 2014/0182272 A1* | 7/2014 | Czimmek | F01N 3/2013 |
| | | | 60/274 |
| 2014/0182366 A1* | 7/2014 | Czimmek | F02M 53/06 |
| | | | 73/114.45 |
| 2014/0182562 A1 | 7/2014 | Kim et al. | |
| 2014/0182563 A1* | 7/2014 | Czimmek | F02M 53/02 |
| | | | 123/557 |
| 2014/0183185 A1* | 7/2014 | Czimmek | H05B 6/06 |
| | | | 219/666 |
| 2014/0197154 A1* | 7/2014 | Czimmek | G05D 23/2401 |
| | | | 219/498 |
| 2014/0197854 A1* | 7/2014 | Czimmek | G01R 27/08 |
| | | | 324/713 |
| 2015/0219050 A1 | 8/2015 | Uchiyama | |
| 2015/0267671 A1* | 9/2015 | Kabasin | F02M 53/02 |
| | | | 219/494 |
| 2017/0082038 A1* | 3/2017 | Dudar | F02M 25/0836 |
| 2017/0305234 A1* | 10/2017 | Krofchalk | B60H 1/00778 |

* cited by examiner

FUEL HEATING DEVICE FOR VEHICLE AND METHOD THEREOF

CROSS-REFERENCE TO RELATED APPLICATION

The present application claims priority to Korean Patent Application No. 10-2016-0089957, filed on Jul. 15, 2016, the entire contents of which is incorporated herein for all purposes by this reference.

FIELD OF THE INVENTION

The present invention relates to a fuel heating device for a vehicle and a method thereof, more particularly, to a technology for safely operating a heater (hot wire) provided inside an injector even when a control signal is not received from an engine control unit (ECU) due to communication failures of a controller area network (CAN) during the starting of the vehicle.

BACKGROUND

In recent years, flex fuel vehicles running on a fuel mixture (E0-E100) of ethanol and gasoline are being increased in the South American countries, such as Brazil, being rich in ethanol resources. Here, E0 refers to 0% ethanol, i.e., pure gasoline, E50 refers to 50% ethanol and 50% gasoline, and E100 refers to 100% ethanol, i.e., pure ethanol.

However, ethanol has a high flash point and a low vapor pressure compared to gasoline, and thus, as the percentage of ethanol in the fuel mixture is increased, this may cause a startability problem under low outside temperature conditions, especially, in wintertime. In other words, when the outside temperature is dropped below 12°, ethanol is difficult to evaporate, which makes it difficult to start an engine.

In order to solve this problem, an auxiliary tank system or a heated injector system has been proposed. The auxiliary tank system is a system that is provided with an auxiliary tank for the storage and supply of a special fuel for cold start. The heated injector system is a system that improves the startability of the engine by heating a fuel to be injected into the engine using a heater inside an injector.

When the auxiliary tank system is applied to a vehicle, it requires the mounting of additional parts/components including a fuel tank, a fuel cap, a fuel pump, a bracket, and a fuel line, and thus, the cost of production is increased and the number of parts/components subject to quality assurance and A/S is increased. In addition, it is necessary to reserve an additional space within a narrow engine compartment, and there is a cumbersome problem including the injection of the special fuel.

For this reason, the heated injector system has recently been applied to most of the vehicles. This system directly heats a highly flammable fuel, which may lead to a vehicle fire, and thus, it requires very high stability.

The conventional heated injector system heats the fuel under control of an engine control unit (ECU) in consideration of stability. In other words, the conventional heated injector system does not heat the fuel if it does not receive a control signal from the ECU through a controller area network (CAN).

Therefore, when a failure occurs in CAN communications, the conventional heated injector system does not work, and thus, it would be difficult to improve the startability of the engine.

The information disclosed in this Background of the Invention section is only for enhancement of understanding of the general background of the invention and should not be taken as an acknowledgement or any form of suggestion that this information forms the prior art already known to a person skilled in the art.

SUMMARY

Various aspects of the present invention are directed to providing a fuel heating device for a vehicle and a method thereof characterized by measuring a resistance of a heater when a failure occurs in communications of a controller area network (CAN) during the starting of the vehicle and operating the heater to heat a fuel to a reference temperature when a temperature of the fuel determined on the basis of the resistance of the heater is lower than or equal to a threshold, thereby safely operating the heater even when failing to be controlled by an engine control unit (ECU) due to the CAN communication failure and improving the startability of the vehicle.

The objects of the present invention are not limited to the foregoing objects, and any other objects and advantages not mentioned herein will be clearly understood from the following description. The present inventive concept will be more clearly understood from exemplary embodiments of the present invention. In addition, it will be apparent that the objects and advantages of the present invention can be achieved by elements and features claimed in the claims and a combination thereof.

According to various aspects of the present invention, a fuel heating device for a vehicle includes: a start sensor detecting a starting of a vehicle; a CAN communication device transmitting and receiving various signals to and from an ECU; a resistance sensor measuring a resistance of a heater provided inside an injector; and a controller controlling the resistance sensor to measure the resistance of the heater when the starting of the vehicle is detected in a state in which a failure occurs in the CAN communication device, converting the measured resistance of the heater into a temperature of a fuel, and operating the heater to heat the fuel to a reference temperature when the converted temperature is lower than or equal to a threshold.

According to another aspect of the present invention, a fuel heating method in a vehicle includes: sensing, by a start sensor, a starting of a vehicle; measuring, by a resistance sensor, a resistance of a heater provided inside an injector; and converting, by a controller, the resistance of the heater, which is measured when the starting of the vehicle is detected in a state in which a failure occurs in a CAN communication device, into a temperature of a fuel, and operating the heater to heat the fuel to a reference temperature when the converted temperature is lower than or equal to a threshold.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
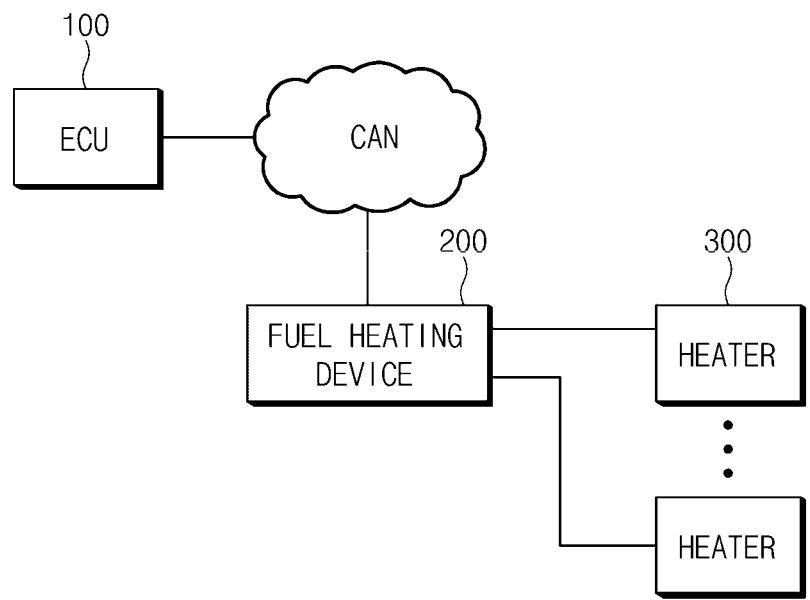
FIG. 1 illustrates a block diagram of the configuration of a fuel heating system for a vehicle to which the present inventive concept is applied.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

The above and other objects, features, and advantages of the present invention in conjunction with the accompanying drawings so that those skilled in the art to which the present invention pertains can easily carry out technical ideas described herein. In addition, a detailed description of well-known techniques associated with the present invention will be ruled out in order not to unnecessarily obscure the gist of the present invention. Hereinafter, exemplary embodiments of the present invention will be described in detail with reference to the accompanying drawings.

FIG. 1 illustrates a block diagram of the configuration of a fuel heating system for a vehicle to which the present inventive concept is applied.

As illustrated in FIG. 1, the fuel heating system for a vehicle to which the present inventive concept is applied includes an engine control unit (ECU) 100, a fuel heating device 200, and a plurality of heaters 300.

The ECU 100 may transmit a control signal for controlling the heating of the heater 300 to the fuel heating device 200 on the basis of a signal from a starting switch, a coolant temperature, an outside temperature, a heater temperature, and the like. Here, the control signal may be transmitted through a controller area network (CAN).

In addition, when an error occurs in the fuel heating device 200, the ECU 100 may cut the power supply to the fuel heating device 200.

The fuel heating device 200 may measure a resistance of the heater 300 when a failure occurs in CAN communications during the starting of the vehicle, and may operate the heater 300 to heat a fuel to a reference temperature (for example, 80 to 90e) when a temperature of the fuel determined on the basis of the resistance of the heater 300 is lower than or equal to a threshold. Thus, even when the fuel heating device 200 is not controlled by the ECU 100 due to the CAN communication failure, the fuel heating device 200 may operate the heater 300 safely, improving the startability of the vehicle.

The heater 300 may be, for example, a hot wire, and may be disposed around a fuel line through which the fuel passes to heat the fuel.

Figure 2:
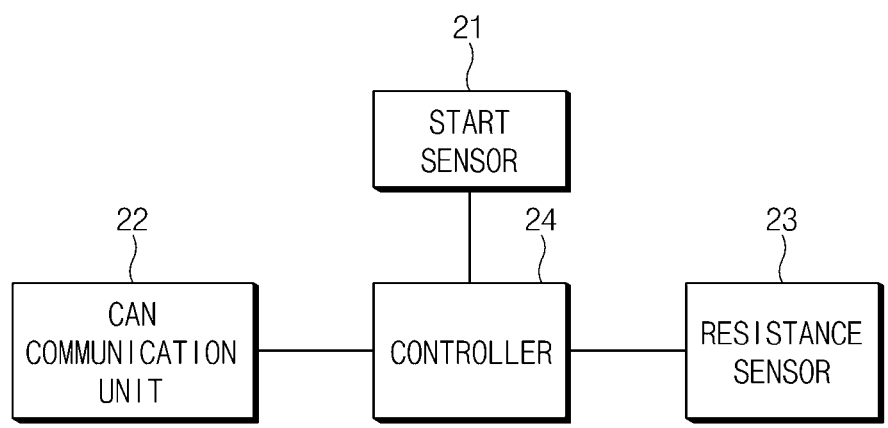
FIG. 2 illustrates a block diagram of the configuration of a fuel heating device for a vehicle, according to an exemplary embodiment of the present invention.

FIG. 2 illustrates a block diagram of the configuration of a fuel heating device for a vehicle, according to an exemplary embodiment of the present invention.

As illustrated in FIG. 2, the fuel heating device, according to the exemplary embodiment of the present invention, includes a start sensor 21, a CAN communication device 22, a resistance sensor 23, and a controller 24.

With respect to each of the aforementioned elements, first, the start sensor 21 may sense the starting of the vehicle on the basis of a signal from a starting switch of the vehicle.

The CAN communication device 22 may be a module providing a CAN communication interface, and may transmit and receive various signals to and from the ECU 100.

The CAN communication device 22 may receive a control signal for controlling the heater 300 from the ECU 100.

The resistance sensor 23 may measure a resistance of the heater 300. That is, the resistance sensor 23 may measure the resistance of the hot wire.

The controller 24 controls the aforementioned respective elements to perform the functions thereof normally.

when a failure occurs in the CAN communication device 22, the controller 24 may control the start sensor 21 to sense the starting of the vehicle and control the resistance sensor 23 to measure the resistance of the heater 300.

Then, the controller 24 may convert the resistance of the heater 300 into a temperature of a fuel, and operate the heater 300 to heat the fuel to a reference temperature when the converted temperature is lower than or equal to a threshold. Here, the controller 24 may count the number of operating the heater 300 in a state in which the failure occurs in the CAN communication device 22, and operate the heater 300 only when the counted number does not exceed a reference value. This is to prevent overdischarge of a battery provided in the vehicle.

Figure 3:
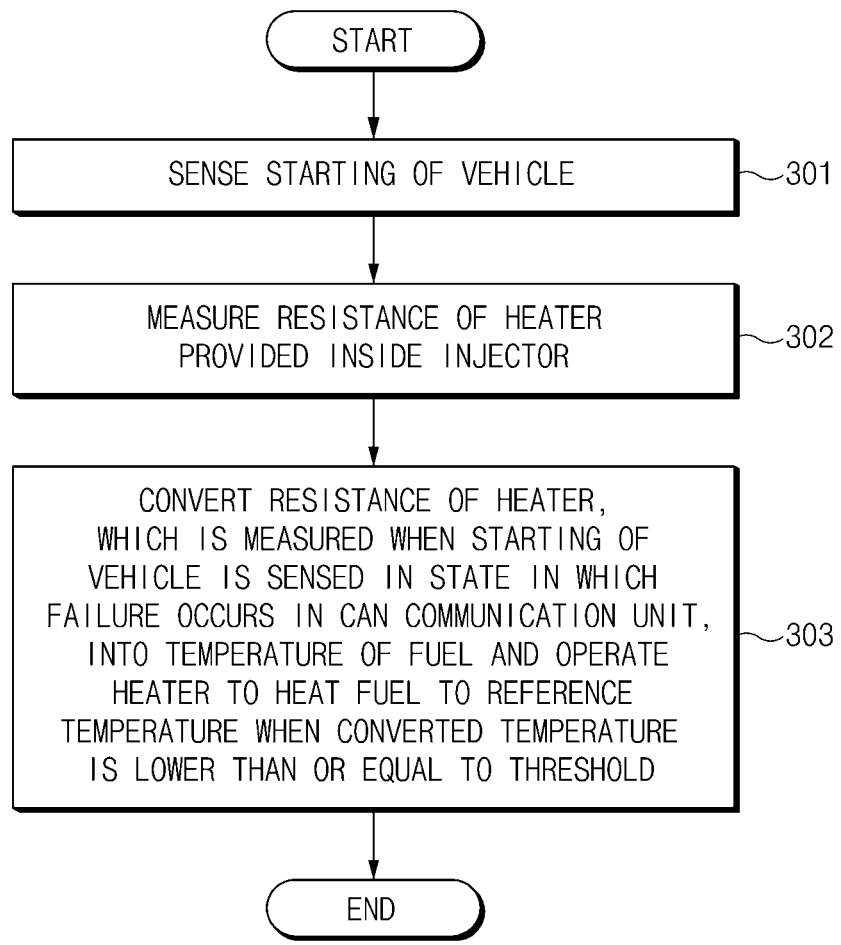
FIG. 3 illustrates a flowchart of a fuel heating method in a vehicle, according to an exemplary embodiment of the present invention.

FIG. 3 illustrates a flowchart of a fuel heating method in a vehicle, according to an exemplary embodiment of the present invention.

First of all, the start sensor 21 may sense the starting of a vehicle in 301.

Next, the resistance sensor 23 may measure a resistance of the heater 300 provided inside an injector in 302.

Thereafter, as the starting of the vehicle is detected in a state in which a failure occurs in the CAN communication device 22, the controller 24 may convert the resistance of the heater 300 measured by the resistance sensor 23 into a temperature of a fuel, and operate the heater 300 to heat the fuel to a reference temperature when the converted temperature is lower than or equal to a threshold in 303. Here, the controller 24 may operate the heater 300 when the number of operating the heater 300 in the state in which the failure occurs in the CAN communication device 22 does not exceed a reference value.

Thus, even when the fuel heating device fails to be controlled by the ECU 100 due to the occurrence of failure in the CAN communications, it may operate the heater 300 safely, improving the startability of the vehicle.

Meanwhile, the above-stated method according to the exemplary embodiments of the present invention may be written as a computer program. Codes and code segments constituting the program may easily be inferred by a computer programmer skilled in the art. The written program may be stored in a computer-readable recording medium (an information storage medium) and be read and executed by a computer, implementing the method according to the exemplary embodiments of the present invention. The recording medium includes all types of computer-readable recording media.

As set forth above, the fuel heating device and method, according to the exemplary embodiments, may measure the resistance of the heater when the failure occurs in the CAN communications during the starting of the vehicle, and operate the heater to heat the fuel to the reference temperature when the temperature of the fuel determined on the basis of the resistance of the heater is lower than or equal to the threshold, allowing the fuel heating device to safely operate the heater even when it is not controlled by the ECU due to the CAN communication failure, and thus, the startability of the vehicle may be improved.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A fuel heating device for a vehicle, comprising:
    a start sensor detecting a starting of the vehicle;
    a controller area network (CAN) communication device performing communication of various signals with an engine control device;
    a resistance sensor measuring a resistance of a heater provided inside an injector; and
    a controller controlling the resistance sensor to measure the resistance of the heater when the starting of the vehicle is detected when a failure of the communication occurs in the CAN communication device, converting the measured resistance of the heater into a temperature of a fuel, and operating the heater to heat the fuel to a reference temperature when the converted temperature is lower than or equal to a threshold.

2. The fuel heating device according to claim 1, wherein the controller operates the heater unless a number of operating the heater when the failure occurs in the CAN communication device exceeds a predetermined value.

3. The fuel heating device according to claim 1, wherein the fuel heated by the heater is one of ethanol, a fuel mixture of ethanol and gasoline, and gasoline.

4. The fuel heating device according to claim 3, wherein when the fuel heated by the heater is ethanol, the reference temperature is 80-90° C.

5. A fuel heating method in a vehicle, comprising:
    sensing, by a start sensor, a starting of the vehicle;
    measuring, by a resistance sensor, a resistance of a heater provided inside an injector; and
    converting, by a controller, the resistance of the heater, which is measured when the starting of the vehicle is detected when a failure of communication occurs in a controller area network (CAN) communication device performing the communication with an engine control device, into a temperature of a fuel, and operating the heater to heat the fuel to a reference temperature when the converted temperature is lower than or equal to a threshold.

6. The fuel heating method according to claim 5, wherein the heater is configured to be operated unless a number of operating the heater when the failure occurs in the CAN communication device exceeds a predetermined value.

7. The fuel heating method according to claim 5, wherein the fuel heated by the heater is one of ethanol, a fuel mixture of ethanol and gasoline, and gasoline.

8. The fuel heating method according to claim 7, wherein when the fuel heated by the heater is ethanol, the reference temperature is 80-90° C.

* * * * *